United States Patent [19]
Inoue

[11] Patent Number: 5,253,340
[45] Date of Patent: Oct. 12, 1993

[54] DATA PROCESSING APPARATUS HAVING A GRAPHICS DEVICE WITH PRIORITY SCHEDULING OF DRAWING REQUESTS

[75] Inventor: Hiroshi Inoue, Yokohama, Japan

[73] Assignee: Canon Kabushiki Kaisha, Shimomaruko, Japan

[21] Appl. No.: 836,518

[22] Filed: Feb. 18, 1992

Related U.S. Application Data

[63] Continuation of Ser. No. 468,605, Jan. 19, 1990.

[51] Int. Cl.5 ............................................. G06F 3/14
[52] U.S. Cl. ..................................... 395/163; 395/158; 395/166; 395/153; 345/1; 345/189
[58] Field of Search ............... 395/112, 113, 116, 118, 395/153, 154, 155, 158, 163, 166; 340/707, 710, 717, 798, 799

[56] References Cited

U.S. PATENT DOCUMENTS

| | | | |
|---|---|---|---|
| 4,367,924 | 1/1983 | Clark et al. | 350/334 |
| 4,655,561 | 4/1987 | Kanbe | 350/350 |
| 4,688,167 | 8/1987 | Agarwal | 395/158 |
| 4,819,189 | 4/1989 | Kikuchi et al. | 395/158 |
| 4,823,108 | 8/1989 | Pope | 340/721 |
| 4,937,743 | 6/1990 | Rassman et al. | 395/155 |
| 4,965,559 | 10/1990 | Dye | 340/717 |
| 4,989,163 | 1/1991 | Kawamata et al. | 395/112 |
| 4,992,958 | 2/1991 | Kageyama et al. | 395/116 |
| 5,001,469 | 3/1991 | Pappas et al. | 395/158 |
| 5,091,723 | 2/1992 | Kanno et al. | 340/784 |
| 5,129,055 | 7/1992 | Yamazaki et al. | 395/158 |

FOREIGN PATENT DOCUMENTS 0093835 11/1983 European Pat. Off. .
0250157 12/1987 European Pat. Off. .

OTHER PUBLICATIONS

Pat. Abs. Jp. vol. 12, No. 303 (p-746) Aug. 18, 1988 (JP-A-63075937).
*Interface*, Mar. 1986, p. 226.
*Interface*, Mar. 1985, pp. 319-322.
*Transistor Technology*, Oct. 1983, pp. 304 and 308.
Texas Instruments, "TMS34010 User's Guide", Publication No. SPVU001, pp. 2-1 to 2-11 and 6-2 to 6-35 (1986).
*Byte*, Jan. 1989, vol. 14, No. 1, pp. 353-360, Pountain, D., "The X Window System".
*Byte*, Jul. 1989, vol. 14, No. 7, pp. 250-257, Hayes, F., et al., "A Guide to GUI's".
Nye, A., *Xlib Programming Manual for Version 11*, vol. 1, pp. 1-46, O'Reilly & Associates, Inc.

*Primary Examiner*—Dale M. Shaw
*Assistant Examiner*—Kee M. Tung
*Attorney, Agent, or Firm*—Fitzpatrick, Cella, Harper & Scinto

[57] ABSTRACT

A data processing apparatus is provided for outputting processed data and data input via an input device, such as a mouse. That data is stored in a memory to be transferred for display in a display device. A controller monitors the data transferred to the display device from the memory, and controls, in accordance with the monitoring, the storage of the data in the memory of the processed data and the input data.

13 Claims, 18 Drawing Sheets

STRUCTURE OF X WINDOW SYSTEM

MODULE STRUCTURE OF SERVER

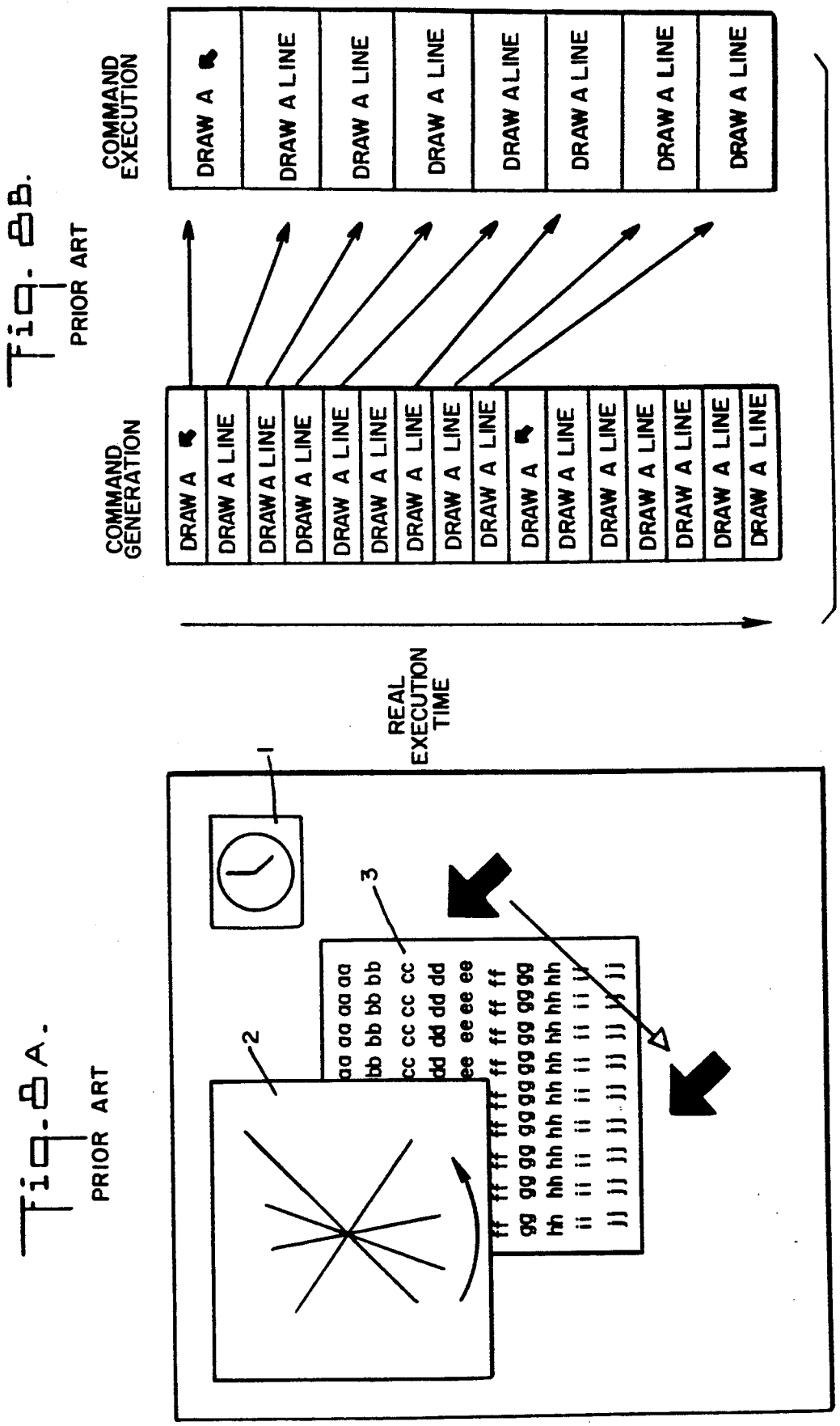

DATA PROCESSING APPARATUS HAVING A GRAPHICS DEVICE WITH PRIORITY SCHEDULING OF DRAWING REQUESTS

This application is a continuation of application Ser. No. 07/468,605 filed Jan. 19, 1990.

FIELD OF THE INVENTION

The present invention relates to a data processing system and apparatus using a ferroelectric liquid crystal display having a memory characteristic and suitable for use as a moving icon display in which a pointing device such as a mouse is represented by a cursor moving on the display. In particular, the invention relates to such a system and apparatus operated under a multitasking operating system, such as UNIX or OS/2.

BACKGROUND OF THE INVENTION

In a multitasking operating system, several data processing tasks are processed by the data processing system concurrently and asynchronously. For example, one or more tasks can be processed by the data processing system at the same time that the system is engaged in controlling its display. Also, in a group of several data processing systems interconnected by a network, a task may be sent for processing from the system where it originated to any other of the data processing systems. Information relating respectively to each task in progress can be displayed simultaneously in a different respective portion ("window") of a single display. (A window is a viewing area on a video display. The term is used to refer either to the full screen being used, or to a smaller region. Typically, but not exclusively, the window is rectangular in shape. Each window can have different display characteristics, such as text vs. graphics or a combination of both, colors, etc.) One graphical user interface for controlling a graphics display, designed for use with the UNIX operating system, is the "X-window", known to those in the art.

Heretofore, as a computer terminal display apparatus, a refresh-scan-type CRT (cathode ray tube) has been generally used, and a vector-scan-type CRT having a memory characteristic is sometimes used as a large, high-resolution display for CAD (computer-aided design). On a vector-scan-type CRT, an image, once displayed, is not refreshed until a subsequent screen refresh (that is, a refresh of the entire screen) is performed. For this reason, it is not well suited as a display apparatus for a real-time man-machine interfacial display, such as a moving cursor display, a moving icon display or pointing device such as a mouse, or an editorial display (for use in editing displayed text, as by insertion, deletion, moving, copying, etc. of characters or strings of characters). On the other hand, the refresh-scan-type CRT requires a refresh cycle with a frame frequency (the frequency with which the display is provided with a new picture, or frame; the frame frequency can be expressed as the reciprocal of the product of the number of scanning lines per frame and the horizontal scanning time for each line) up to 60 Hz or more for the purpose of preventing the display from flickering. A non-interlaced scanning scheme is commonly adopted so that a moving display of data in a picture, e.g., a moving display of an icon, is easy for the user to observe and follow.

With both types of CRT, the higher the desired display resolution, the larger < the display apparatus becomes, resulting in higher power consumption, a larger drive controller unit and a higher cost. Such a large, high-power CRT results in various inconveniences, due to which a flat display panel has been developed in recent years.

At present, there are various systems of flat display panels. One employs a highly multiplexed drive system using super twisted nematic liquid crystals (STN). A second is a modification thereof, used for a white-and-black display. A third is a plasma display system. All of these adopt the image data transfer scheme of the CRT system and a non-interlaced scanning scheme with a frame frequency of 60 Hz or higher for screen refreshing and therefore require a total number of scanning lines on the order of 400–480 lines for one full screen. A large flat display panel having, e.g., 1000 or more scanning lines has not yet been made using any of these approaches. This is because these display panels require a refresh cycle with a frame frequency of 60 Hz or higher to prevent flicker. Also, this requirement in turn leads to a single-line scanning time of 10–50 $\mu$sec or shorter, which, in such a system, is too short to provide good contrast.

With a CRT, an image formed on a fluorescent screen persists for a certain time due to the fluorescence. In a TN-type LCD (twisted nematic-type liquid crystal device), an image is formed by utilizing transmittance changes effected by an application of a sufficient driving voltage. In both types of device, it is necessary to use a sufficiently high frame frequency. For both types, the required frame frequency is generally considered to be 30 Hz or higher. The common scanning processes or modes at present include interlaced scanning (skipping one or more lines after each line, e.g., scanning only the odd-numbered or only the even-numbered lines), and non-interlaced scanning process (with no skipping). Other scanning processes include the pairing process and a process comprising simultaneous and parallel scanning of different portions of the picture screen (the latter process is restricted to LCD's). The NTSC standard system calls for interlaced scanning of 2 fields per frame and a frame frequency of 30 Hz, wherein the horizontal scanning time is about 63.5 $\mu$sec and about 480 scanning lines are used (in the effective display area). The TN-type LCD has generally used a non-interlaced system including 200–400 scanning lines and a frame frequency of 30 Hz or higher. For use with a CRT, a non-interlaced scanning system with a frame frequency of 40–60 Hz and 200–1000 scanning lines has also been employed.

A typical CRT display or TN-type LCD may comprise 1920 (number of scanning lines)×2560 (pixels per line)=4,915,200 pixels. In the case of an interlaced system using a frame frequency of 30 Hz, the horizontal scanning time is about 17.5 $\mu$sec and the horizontal dot clock frequency is about 147 MHz (without taking into consideration the horizontal flyback time required in a CRT). In the case of a CRT, a horizontal dot clock frequency of 147 MHz leads to a very high beam scanning speed which far exceeds the maximum electron beam modulation frequency of the beam guns used in picture tubes available at present, so that accurate image formation cannot be effected, even by scanning at 17.5 $\mu$sec per line. In the case of a TN-type LCD, driving a total of 1920 scanning lines corresponds to a duty factor of 1/1920, which is much lower than the minimum usable duty factor of about 1/400 now possible so that the desired display cannot be achieved. On the other hand, if driving at a practical horizontal scanning speed is used, the frame frequency becomes lower than 30 Hz, and flickering impairs the display quality. For these reasons, enlargement and densification of the picture obtainable with CRT's and TN-type LCD's has been limited because the number of scanning lines cannot be sufficiently increased.

In recent years, Clark and Lagerwall (U.S. Pat. No. 4,367,924) have proposed a ferroelectric liquid crystal (FLC) device having both a high-speed responsive characteristic and a memory characteristic (bistability, the property of assuming either a first optically stable state or a second optically stable state, depending on an applied electric field, and retaining the resultant state in the absence of an electric field). The ferroelectric liquid crystal device shows a chiral smectic C phase (SmC*) or H phase (SmH*) in a specific temperature range, and in this state, shows bistability. The FLC device shows quick response to changes in the applied electric field and is therefore expected to be widely used as a high speed memory-type display device.

A ferroelectric liquid crystal is capable of being used in a large, high-resolution display which surpasses the above-described display apparatus remarkably. In view of its low frame-frequency drive, it is provided with a partial rewriting scanning scheme (in which the only scanning lines rescanned at a given time are those in a region to be overwritten, viz., where previously displayed information is to be replaced with other information) utilizing a memory characteristic in order to provide a man-machine interfacial display apparatus. Such partial rewriting scanning has been disclosed, e.g., in commonly-assigned U.S. Pat. No. 4,655,561 to Kanbe, et al. (the entire disclosure of which is incorporated herein by reference).

A flat panel display comprising a number of pixels equal to 1920 (number of scanning lines) × 2560 (pixels per line) has been achieved using the bistability effect of ferroelectric liquid crystals.

In a line by line scanning scheme for a ferroelectric liquid crystal display (FLCD), the frame refresh frequency decreases as the number of scanning line increases. For example, the frame frequency for an FLCD with a scanning time of 50 μsec/line is:

1920 lines × 50 μsec/line = 96 msec = 10 Hz.

On the other hand, it is a very important factor for the operability of computers that the speed for real-time response, the smoothness for the pointing device movement and the keyboard input response time be sufficient for normal use. The pointing devices and character inputs are relatively small in terms of their display area, but require a higher response rate for them each to be properly displayed. For instance, a mouse is written normally at a rate of 60 Hz, and the character input is written at a rate of 30 Hz. Therefore, a frame frequency of 10 Hz is not sufficient for normal operation. The use of the aforementioned "partial rewriting scanning technique" enables the display to rewrite only the portion of the display where new information is to be shown. As a result, the time required for updating the displayed information is reduced. For example, if the mouse font is defined by 32×32 bits data, the speed for displaying that data is:

32 lines × 50 μsec./line = 1.6 msec. = 625 Hz.

However, actually to use this partial rewriting scanning technique, it is necessary to recognize the partial-rewriting requests and to indicate to the display apparatus the number of lines to be rewritten. Moreover, it involves other procedures relating to the display requests, such as saving background data which are to be overlaid. The processing time for these procedures depends upon the contents of the partial rewriting scanning. It should be noted, however, that the actual frequency for the partial rewriting cannot reach 625 Hz. In general, the processing time for the partial rewriting is proportional to the size of the area to be rewritten, i.e. the number of scanning lines in that area. In the case of a computer terminal display apparatus used as a human interface, there arises the following problem in its functionality.

FIGS. 8A and 8B show an example of a conventional display scheme. In FIG. 8A, three windows 1, 2, 3 are open in the display. In window 1 a first task generates a moving clock, to display the time. In window 2 a second task generates a rotating line (rotating in the direction of the arrow). A text editor is displayed in window 3. Also, a mouse font (large arrow) is moved from one location to another on the display (in the direction of the thin diagonal arrow). FIG. 8B illustrates the time sequence of the generation of the drawing commands (on the left) and the time sequence of the execution of those commands (on the right). As illustrated, the movement of a pointer by the operator moving a mouse is not synchronous with the display. In the top box in each column of FIG. 8B, the mouse is positioned and drawn on the display. Several successive commands (eight, in this example) to draw a line in window 2 are then received, and are executed one after the other. After the eighth line-drawing command is generated, the mouse is moved and a new command to draw it is generated. This command is carried out once the preceding line-drawing commands have been executed, but the execution of each box on the right figure takes the aforementioned processing time, and, as a result, the mouse is not drawn at its new position until quite some time after the operator moved it. The operator, however, is expecting the pointer to move at the same time as he or she moves the mouse, i.e., substantially in real time. This characteristic not only is very disconcerting to the operator, but leads to a tendency for incorrect input by the operator, or at the least, to an appearance in slowness of the system.

SUMMARY OF THE INVENTION

An object of the present invention is to provide a ferroelectric liquid crystal display apparatus suitable for an image display maintaining real-time operability.

Another object of the present invention is to provide a data processing system and apparatus suitable for running under a multitasking operating system, using a ferroelectric liquid crystal display apparatus capable of a smooth high-speed display movement of a display font from a pointing device in a scroll display window.

Another object of the present invention is to provide a data processing system and apparatus suitable for running under a multitasking operating system, capable of high-speed cursor movement and mouse movement under scanning drive at a frame frequency as low as 10 Hz or below.

According to the invention, a data processing apparatus, which outputs processed data, is provided with an input means for inputting data and a memory means for storing the processed data and data from the input means. A display (e.g., a CRT or FLC display, or other display device) means displays data transferred from the memory means. A control means is provided for monitoring the data transferred to the display means from the memory means. The control means controls, in accordance with the monitoring, storage in the memory means of the processed data and of the data input via the input means.

These and other objects, features and advantages of the present invention will become more apparent upon a consideration of the following detailed description of the preferred embodiments of the present invention taken in conjunction with the accompanying drawings.

BRIEF DESCRIPTION OF THE DRAWINGS

FIG. 8, consisting of FIGS. 8A and 8B, is an illustration of a conventional drawing request and partial re-writing used for a CRT;

DETAILED DESCRIPTION OF THE PREFERRED EMBODIMENTS

Figure 1:
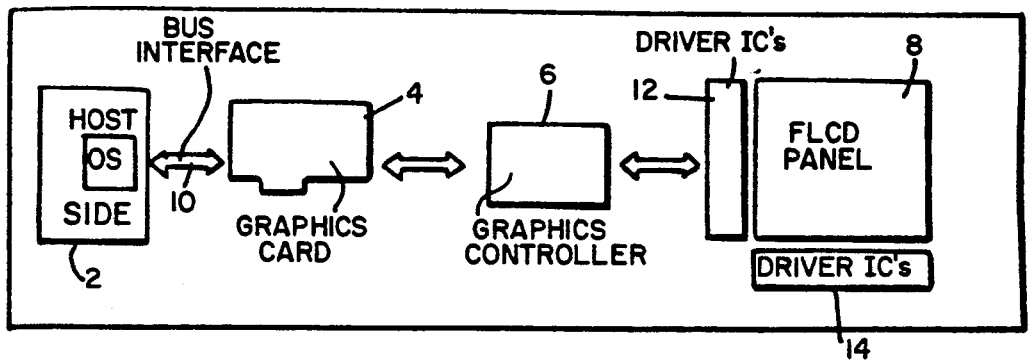
FIG. 1 is a block diagram of a liquid crystal display apparatus and a graphics controller according to one embodiment of the invention.

FIG. 1 is an illustration of a data processing apparatus having a ferroelectric liquid crystal display 8. A host computer 2 is connected to a graphics card 4 via a bus interface 10 for providing video signals to graphics controller 6. The graphics controller 6 drives the ferroelectric display 8 in accordance with the video signals by providing signals to an information driver 12 and a data driver 14.

Figure 3A:
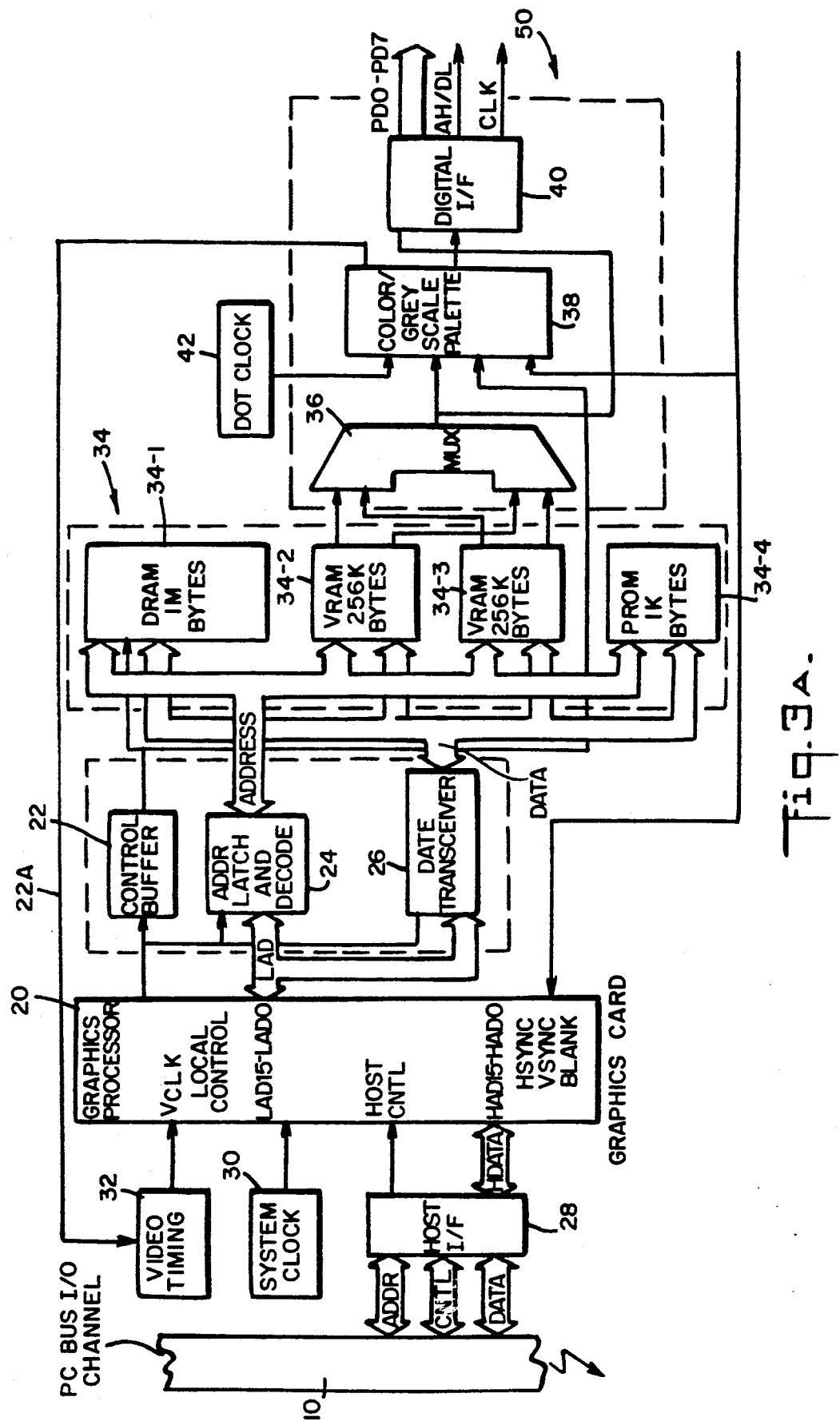
FIG. 3A is a block diagram of a graphics card used in that embodiment.

FIG. 3A is a block diagram of the graphics card. The graphics controller comprises a graphics processor 20, an interface 28, and a memory controller 22A for a memory 34. The memory 34 includes random access memory (RAM) 34-1 for storing instructions, video random access memories (VRAM) 34-2 and 34-3 for storing video output and read only memory (ROM) 34-4 for storing the control instructions for graphics processor 20. The memory controller 22A includes control buffer 22, address converter 24 and data transceiver 26. Data is communicated between the processor 20 and the memory 34 via the data transceiver 26. Video timing unit 32 provides a synchronism signal to the graphics processor 20, while clock 30 provides the timing signal for the graphics processor. The outputs of the video random access memories 34-1, 34-2 are provided as input to an output interface 50, which comprises a multiplexer 36, via which they are passed to color/gray scale palette 38 for providing the appropriate gray scale or color signal levels. A digital interface 40 provides address data and image data through transmission signal lines PD0–PD7, and discrimination signal AH/DL and timing signal CLK to the graphics controller 6.

The graphics processor 20 can for example be a Texas Instruments GSP34010 processor, which can execute both graphics instructions and general-purpose instructions, and the interface 28 can be an IBM "AT Bus", both of which are familiar to those skilled in the art. The GSP34010 processor is described in detail in the TMS34010 User's Guide published by Texas Instruments Inc. (publication number SPVU001).

Figure 2:
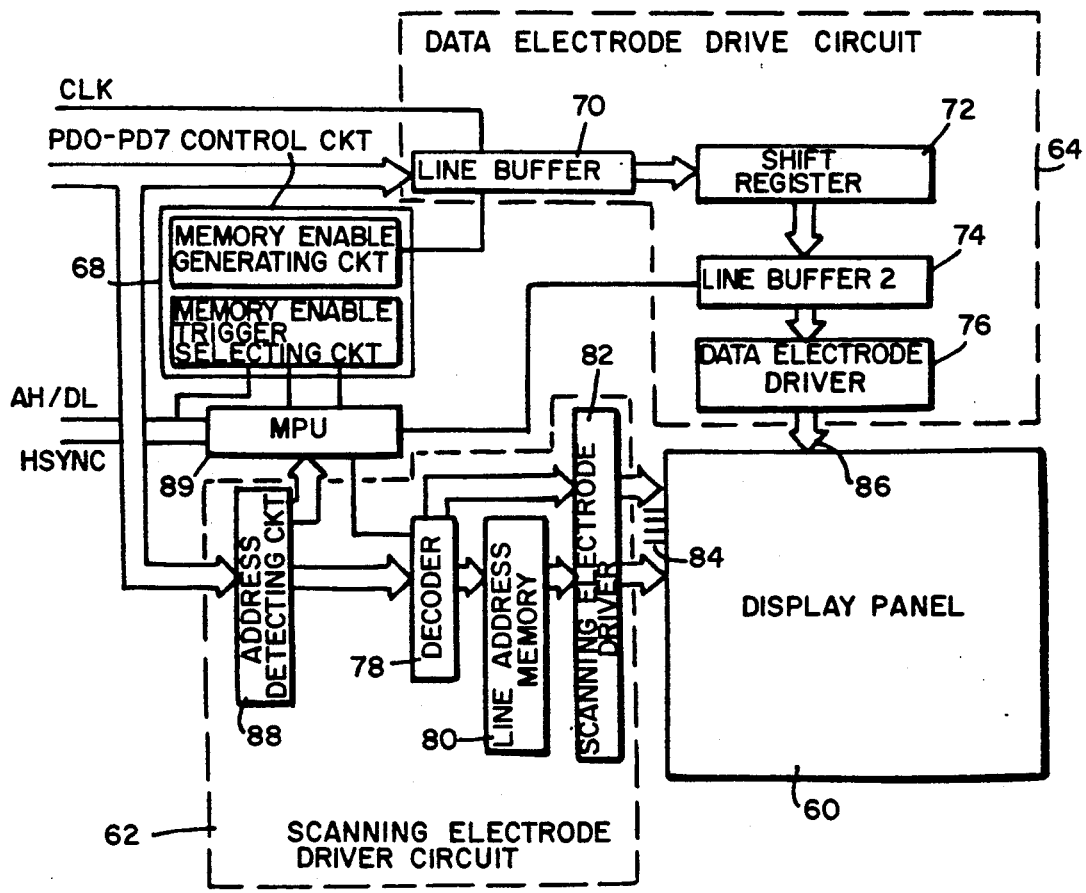
FIG. 2 is a block diagram of a graphics controller used in that embodiment.

FIG. 2 is a block diagram of a ferroelectric liquid crystal display system. A display panel 60 comprises a matrix electrode structure composed of 1920 scanning electrodes 84, in one plane, and 2560 data electrodes 86, in another plane, between which planes a ferroelectric liquid crystal is disposed. The scanning electrodes 84 are connected to a scanning electrode drive circuit 82, and the data electrodes are connected to a data electrode drive circuit 76. The scanning electrode drive circuit 62 is provided with a decoder 78, a line address memory 80 and a address detecting circuit 88. The data electrode drive circuit 64 is provided with a shift register 72, a line memory 74 and a buffer 70.

The scanning electrode address data for addressing the scanning electrodes 84 and image data are supplied from digital interface 40 of the graphics processor to a control circuit (such as shown in co-pending U.S. application Ser. No. 440,321, filed Nov. 22, 1989, by Miyamoto et al., the entire contents of which are incoporated herein by reference) through eight signal lines PD0–PD7. In this embodiment, scanning electrode address data (A0, A1, A2, ..., A15) and image data (D0, D1, D2, D3 ..., D2558, D2559) are transferred through the same transmission signal lines PD0–PD7. Thus, it is necessary to differentiate the scanning electrode address data from the image data. In this embodiment, discriminating signal AH/DL is used for that purpose. The AH/DL signal, when at a high level, denotes scanning electrode address data, and when at a low level, denotes image data. The AH/DL signal also contains a code for a transfer-initiation signal, for transferring display data.

When scanning electrode address data are supplied to the scanning electrode drive circuit 62 and image data are supplied to the data electrode drive circuit 64, the scanning electrode address data A0–A15 and the image data D0–D2559 are serially supplied through the signal lines PD0–PD7. It is necessary to provide a circuit for properly distributing the scanning electrode address data A0–A15 and the image data D0–D2559 (that is, for extracting the scanning electrode address data A0–A15). This operation is performed by the control circuit 68 having a memory enable generating circuit 68A and a memory trigger selecting circuit 68B. The control circuit 68 extracts the scanning electrode address data A0–A15 supplied through the signal lines PD0–PD7, temporarily stores the data and supplies the data to the scanning electrode drive circuit 62 in a horizontal scanning period for driving a designated scanning electrode 84. The scanning electrode address data A0–A15 are supplied to the decoder 78 in the scanning electrode drive circuit 62 and select a scanning electrode 84 through the decoder 78.

The image data D0–D2559 are supplied to line buffer 70 and then to the shift register 72 in the data electrode drive circuit 86 and separated into image data D0–D2559 for pixels corresponding to the data electrodes 86 (2560 lines) while being shifted four pixels each by transfer clock signals CLK. When the shifting of the data for one horizontal scanning line is completed by the shift register 72, 2560 bits of the image data D0–D2559 in the shift register 72 are transferred to the line memory 76 and stored therein in a horizontal scanning period.

In this embodiment, the drive of the display panel 60 and the generation of the scanning electrode address data A0–A15 and image data D0–D2559 in the graphics processor are not synchronized, so that it is necessary to synchronize the control circuit 68 and the graphics processor at the time of display data transfer. For this purpose, a synchronizing signal Hsync is generated in the control circuit for each horizontal scanning. The signal Hsync is associated with the signal AH/DL. The graphics processor monitors the signal Hsync to transfer display data when the signal Hsync is low and does not effect transfer of data for one horizontal scanning when the signal Hsync is high.

Figure 13:
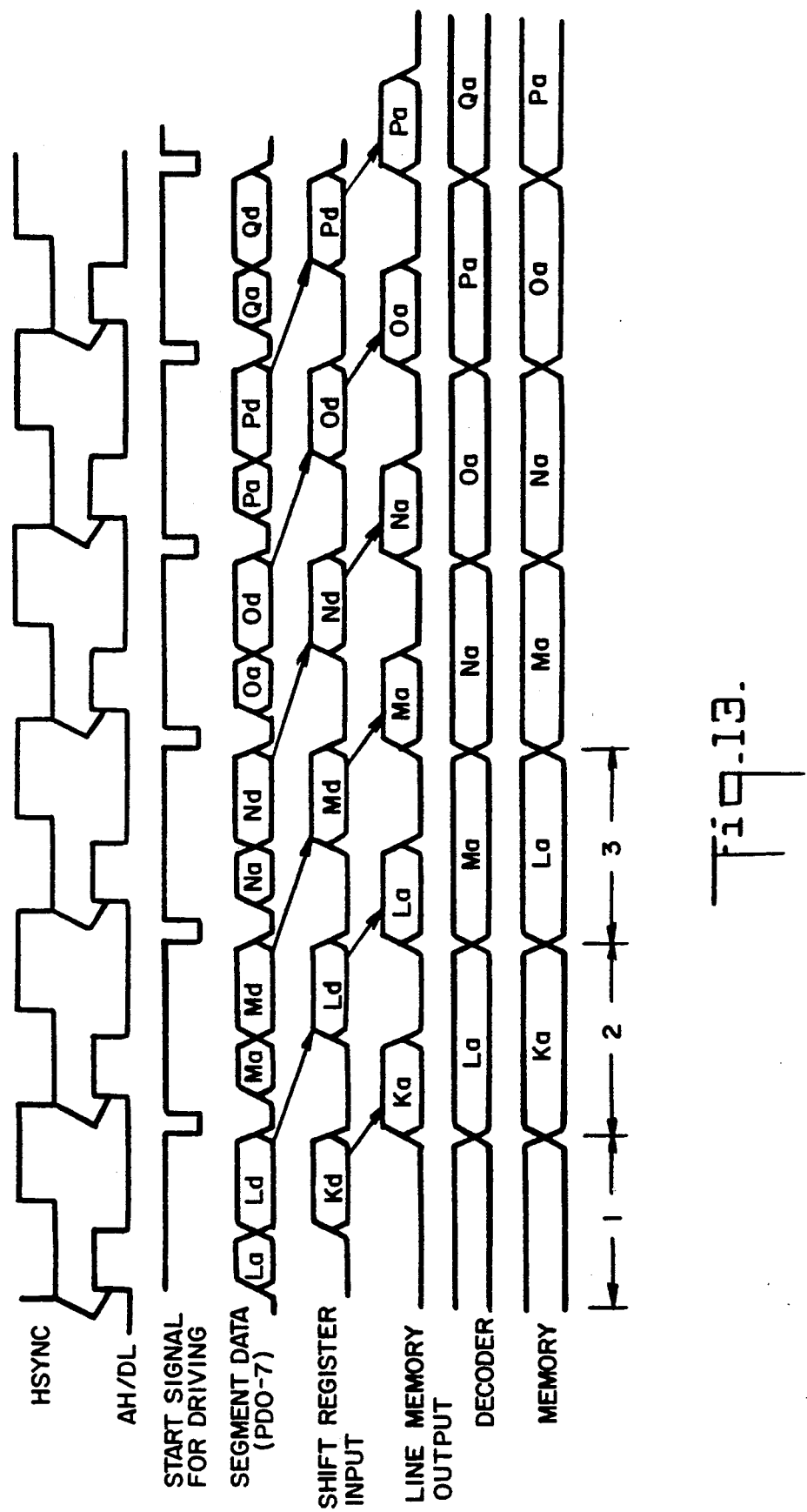
FIG. 13 illustrates the time sequence of various signals in the graphics controller.

More specifically, referring to FIG. 13, at an instant when the signal Hsync is turned low, the AH/DL signal is turned high. The control circuit 89 returns the Hsync signal to high during the display data transfer period. As is shown, the data in segment data (PD0–PD7) corresponds to the scanning information in periods La, Ma, Na . . . and the data signals in periods Ld, Md, Nd . . . . The data signals are shifted by shift register 72 and stored in line buffer 74 before being processed by decoder 76. The information signals are decoded by decoder 78 and stored in memory 80.

Figure 4:
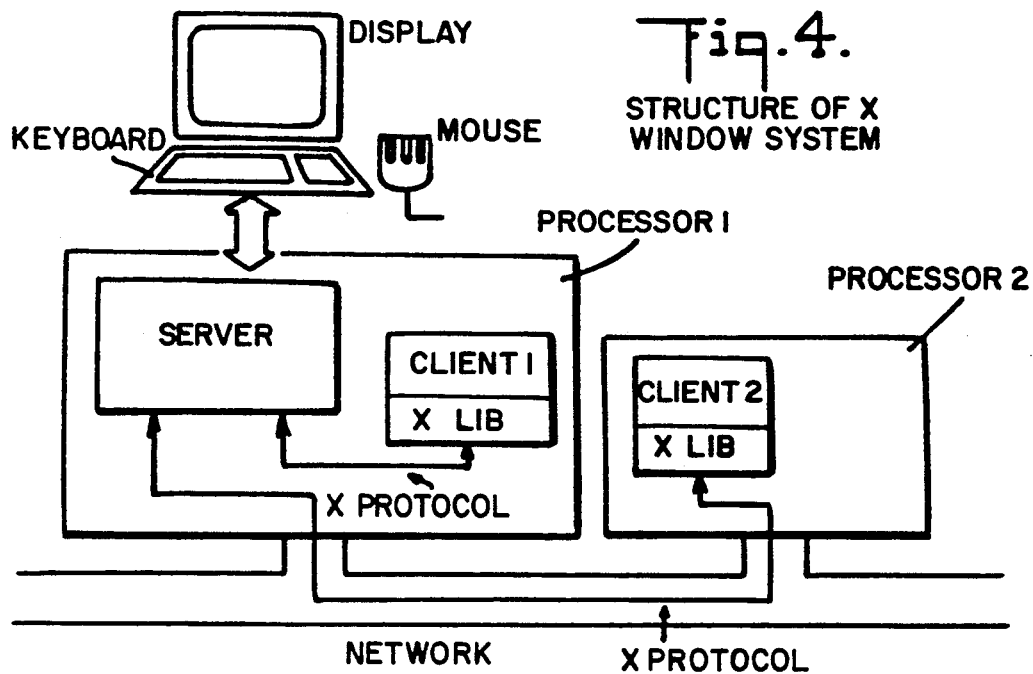
FIG. 4 is a block diagram of a multitasking operating system used in the first embodiment.

The data processing apparatus will now be explained. FIG. 4 shows an arrangement using the Unix operating system and the X-Window graphical user interface. This arrangement is provided with a display server with multiple clients and a mouse, as an input device. The input device can also be a light pen, a touch sensitive screen, a track ball or the like. A display server is a program that runs on a host system that supports a graphics display, keyboard and mouse (keyboard and mouse inputs will be referred to as "hardware requests"). A client is an application which can be processed on the same host as the server or on a different host which is interconnected to the display server via a network. The server processes writing requests from clients, reads the status of hardware events (keyboard and mouse inputs), executes these events and notifies the appropriate clients.

Each time a client needs to communicate with a display server a connection must first be requested and then established. In FIG. 4, Client 1 is processed on the same processor as the display server, and Client 2 is processed on a different processor, Processor 2. Processor 2 communicates with Processor 1 via a network using a transmission protocol called "X-protocol". Client 1 communicates with the display server by sending data packets conforming to the X-Protocol.

The X-Protocol is, in effect, a high-level graphics-description language, and is known to those skilled in the art. Both Client 1 and Client 2 utilize the facilities of the X-lib library functions (part of the X-window system and, as such, well known to those skilled in the art) to facilitate the use of the X-protocol.

The client and server might, in some cases, be processed on the same work station, as illustrated in FIG. 4 with both Client 1 and the server on Processor 1, or the client and processor may be processed on different work stations, as with Client 2 on Processor 2 and the server on Processor 1. Client 2 communicates with the server via a network. (The physical means of communication is immaterial to X Windows since X-Protocol is the same in all cases, that is, it is network-transparent.)

Figure 5:
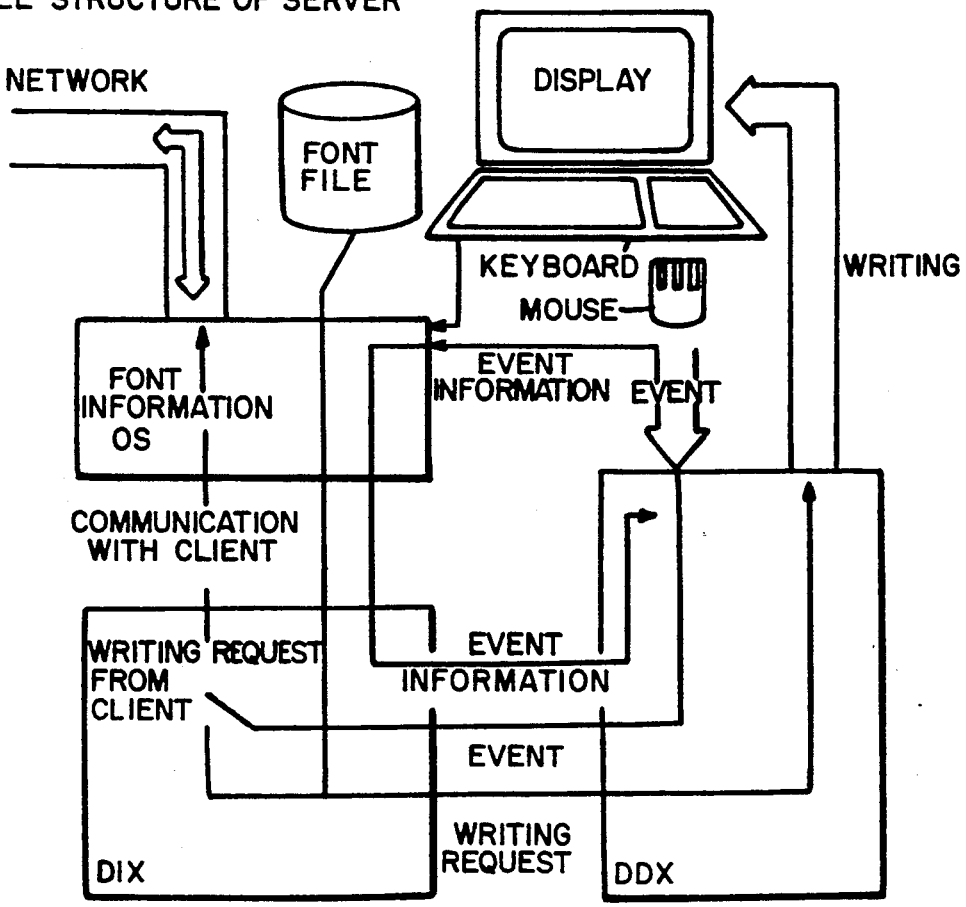
FIG. 5 is a block diagram of a server module used in that embodiment.

FIG. 5 illustrates the modular structure of the server. Its primary function is to assure connection with clients, process client requests and process requests from the keyboard and mouse. The three primary modules of the server are "Device Independent X" (DIX), "Device Dependent X" (DDX) and "Operating System" (OS).

DIX forms the structure of the window and the like by controlling the whole flow. DIX processes the client requests, reads the hardware requests and performs the distribution to clients by calling the other modules' functions. A DIX program is the same regardless of the hardware and of the operating system being used.

DDX comprises two portions for directly controlling the input and the output devices, respectively. The input portion reads events from the hardware, adjusts the mouse transfer sensitivity, and controls the input device (e.g., mapping the keycode). The output portion executes writing requests, forming and changing of graphic context (attributes of a graphic such as location, size, operation code, color and font, etc.) and the like.

OS performs the reading function for the client's connection, network connection and the communication therebetween and also informs the client of any input event. OS also functions for smoothly controlling the time sharing among the clients, the file-access function for fonts (sets of predetermined characters or other symbols) and the memory controlling function.

Figure 10:
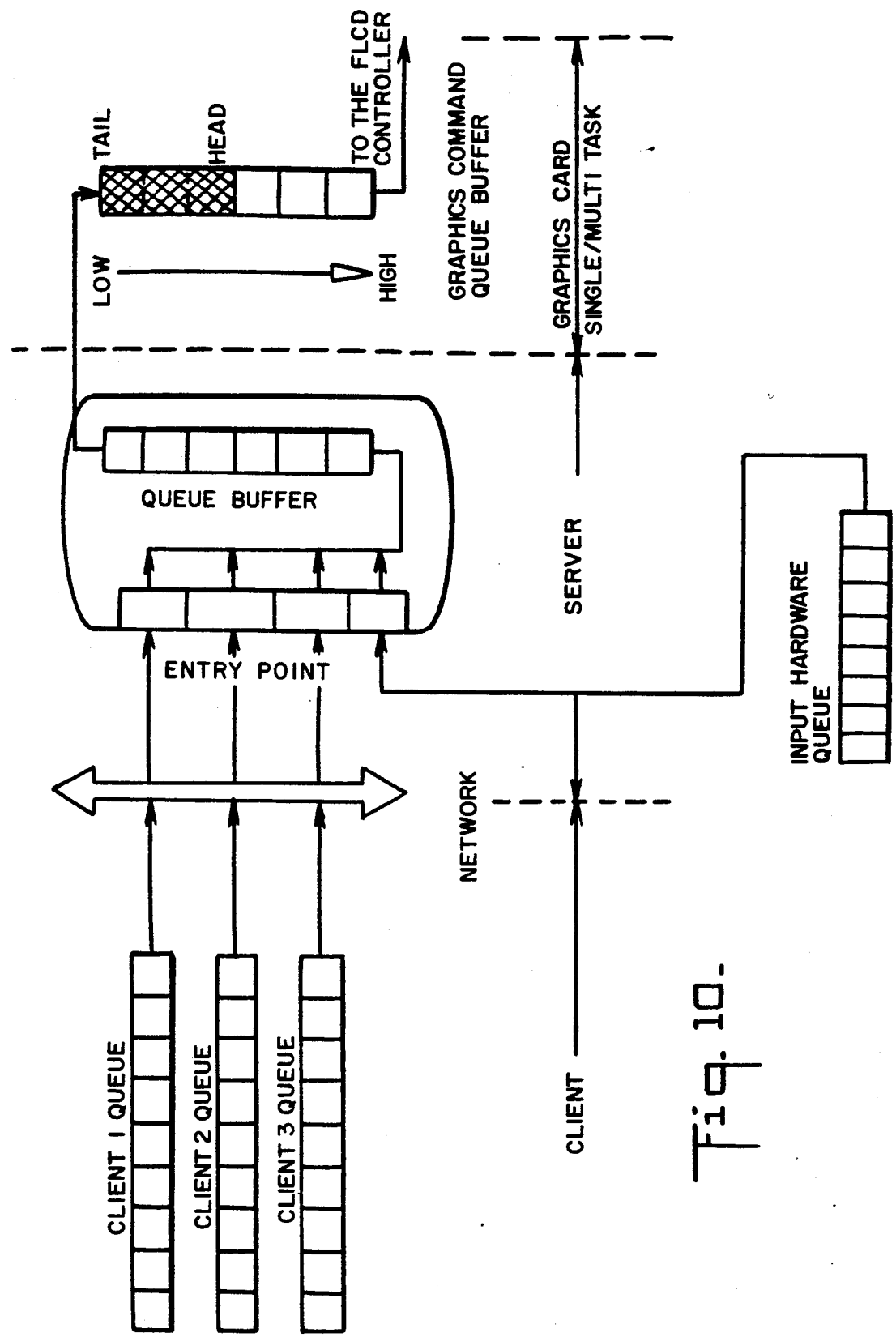
FIG. 10 is an illustration of a multitasking network.

FIG. 10 schematically shows an arrangement of the host system and the display system, including the graphics processor. The host system comprises a display server connected to plural clients. Display data generated by the clients or by hardware requests are sequentially stored in respective queue buffers. The stored data is then sequentially transferred to the server command queue and then to the graphics command queue for processing by the graphics processor for display.

As shown in FIG. 10, the clients and the input device each have a respective queue for storing time-sequential data output by the corresponding client or input device.

That data in turn is transferred time-sequentially to a display server queue buffer. However, any data in the input device queue is transferred to the display server queue buffer prior to the transfer of any data stored in the client queues. The effect of this transfer arrangement is to provide an appropriately short response time for display requests from the input device.

Figure 6:
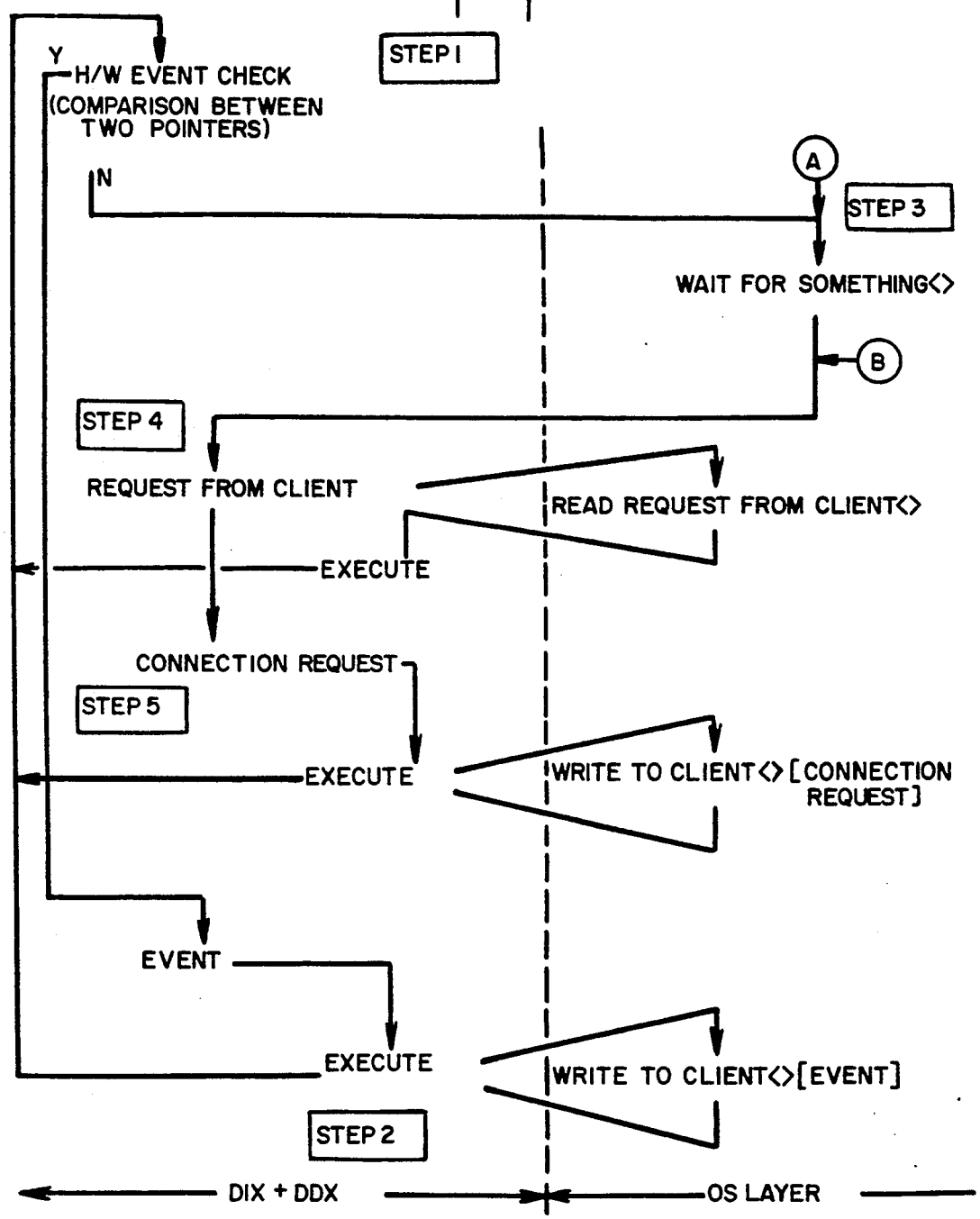
FIG. 6 is a logic diagram of the "Dispatch" routine used in that embodiment.

FIG. 6 is a flow chart of the "Dispatch" routine, implementing this system of transferring data from the client queue, and the hardware requests to the server queue. In step 1, the routine determines if there are any hardware requests from the input device. If there is a hardware request, that request is processed, in step 2, and is written to a corresponding client. If no hardware request is present, the next step in the process, step 3, is the routine "Wait-For-Something", which is discussed below. A request from a client is processed in step 4. The request is read from the client and then executed before returning to the beginning of Dispatch. Similarly, the connection request is executed in step 5, after which the process returns to the beginning of the routine.

Figure 15:
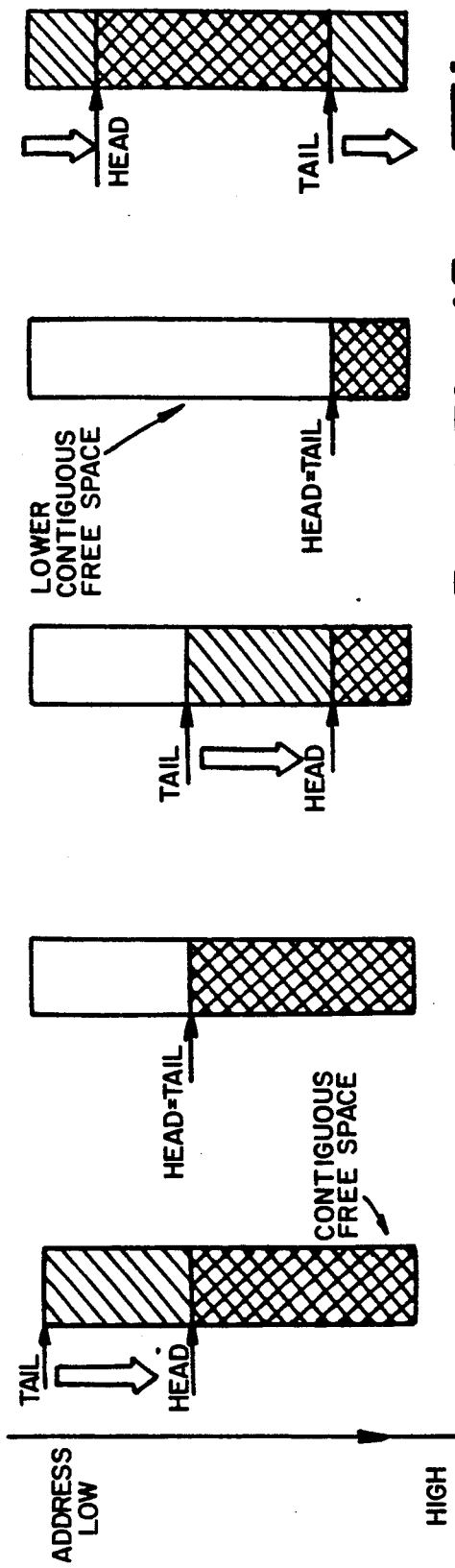
FIGS. 15A–15E are illustrations of the Head address, the Tail address and contiguous free space used in the first embodiment.
FIG. 15F is a table showing examples of the Head address, Tail address, and contiguous free space calculated by the Qspace routine.

Before proceeding with the discussion of the Wait-For-Something routine, the concept of Head, Tail and unused contiguous space will be explained, with reference to FIGS. 15A-15E. FIGS. 15A-15E illustrate various configurations of the data stored in the graphics command queue buffer. The data is sequentially written into the graphics command queue buffer starting from the Tail address to the Head address, and is executed by the graphics processor from the Tail address to the Head address. The Head address is modified by the host display software when data is written into the graphics command queue buffer, and the Tail address is modified by the remote display software as the graphics data is executed by the graphics controller. (The term "host display software" is explained below.) FIGS. 15A and 15C illustrate situations when the Head address is greater than the Tail address, FIGS. 15B and 15D when the Head address equals the Tail address, and FIG. 15E when the Tail address is greater than the Head address.

FIG. 15F is a table illustrating actual examples of the Head addresses, the Tail addresses and the corresponding contiguous free space using the Qspace routine.

Figure 11:
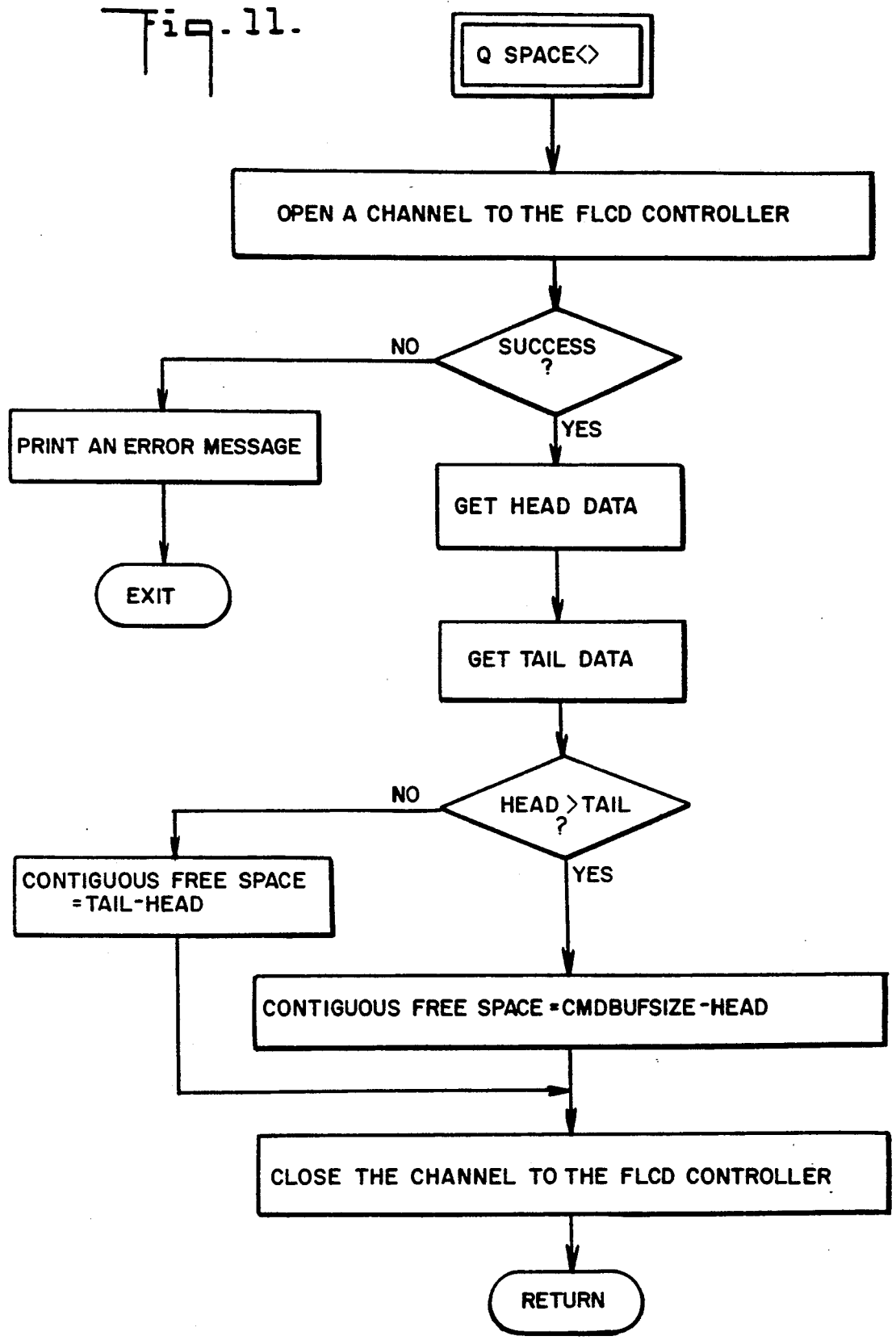
FIG. 11 is a flowchart showing the logic of the "Qspace" routine.

FIG. 11 illustrates the Qspace routine, which is for determining the amount of unused contiguous available space. If the Head address is greater than or equal to the Tail address, as shown in FIGS. 15A-15D, the amount of unused contiguous available space is the command buffer size less the Head address. If the Head address is less than the Tail address, as shown in FIG. 15E, the amount of unused contiguous available space is the Head address less the Tail address.

Figure 12A:
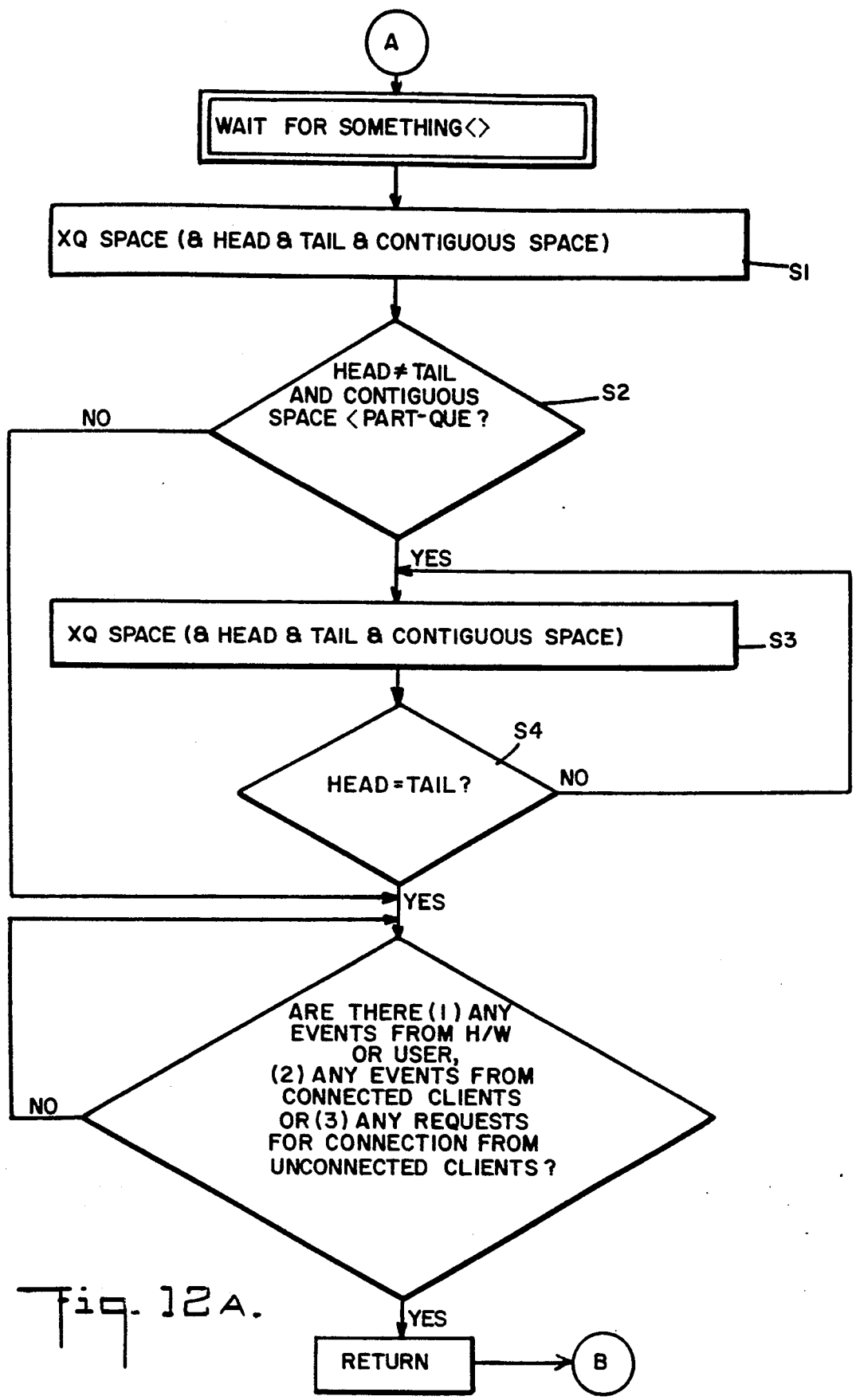
FIG. 12A is a flowchart showing the logic of the routine "Wait-For-Something"

FIG. 12A illustrates the routine Wait-For-Something. A routine "XQspace" (this routine is the same as Qspace, but is processed in the X-Window layer) is first called to determine the Head address, the Tail address and the amount of unused contiguous space. If the Head address is not equal to the Tail address and the amount of contiguous available space is less than a predetermined value (step S2), processing continues to a loop comprising steps S3 and S4, which loop is repeated until the Head address is equal to the Tail address. At the same time the graphics processor is processing the commands stored in the command queue buffer. The Tail address will change as commands are executed in the graphics processor (see discussion of FIGS. 16 and 17 below). When the Head address equals the Tail address in step S4, processing proceeds to step S5 (see below). If result of the Head address equals the Tail Address or the unused contiguous space is greater then a predetermined value, processing proceeds to step S5. In step S5 the Wait-For-Something routine waits for a hardware request, client request or connection request before returning to the dispatch routine.

Figure 12B:
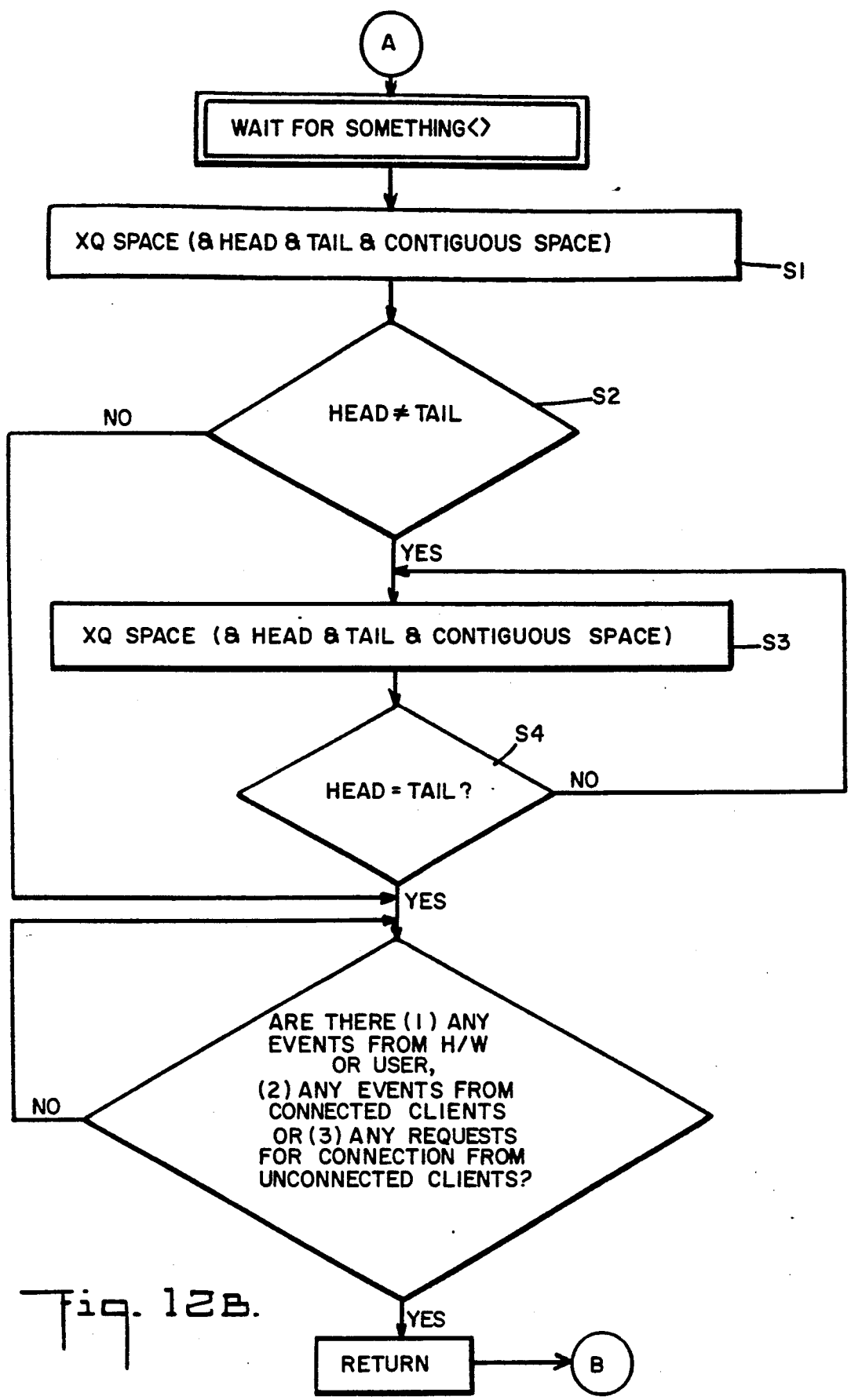
FIG. 12B is a flowchart showing the logic of another version of the routine "Wait-For-Something"

FIG. 12B is a flow chart of an alternate Wait-For-Something routine. This routine is very similar to that in FIG. 12A, and therefore does not need to be explained in detail, except that the routine in FIG. 12B does not evaluate the exact amount of unused contiguous space in the command queue buffer, but merely determines whether Head equals Tail in deciding whether to accept the next command. While the routine as shown in FIG. 12B is shorter, that in FIG. 12A is preferred.

Figure 7:
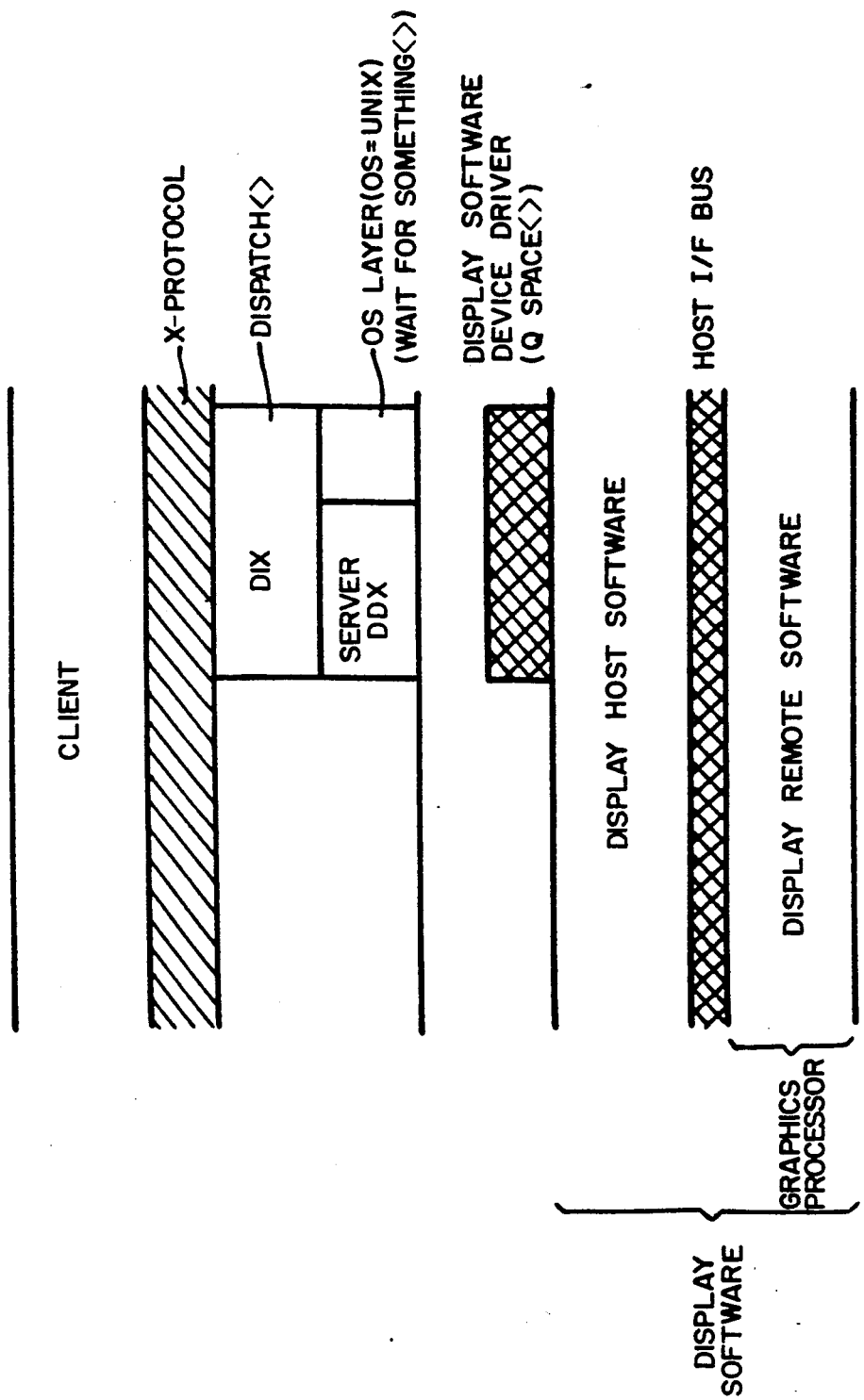
FIG. 7 is a diagram illustrating the software layers in that embodiment.
Figure 14:
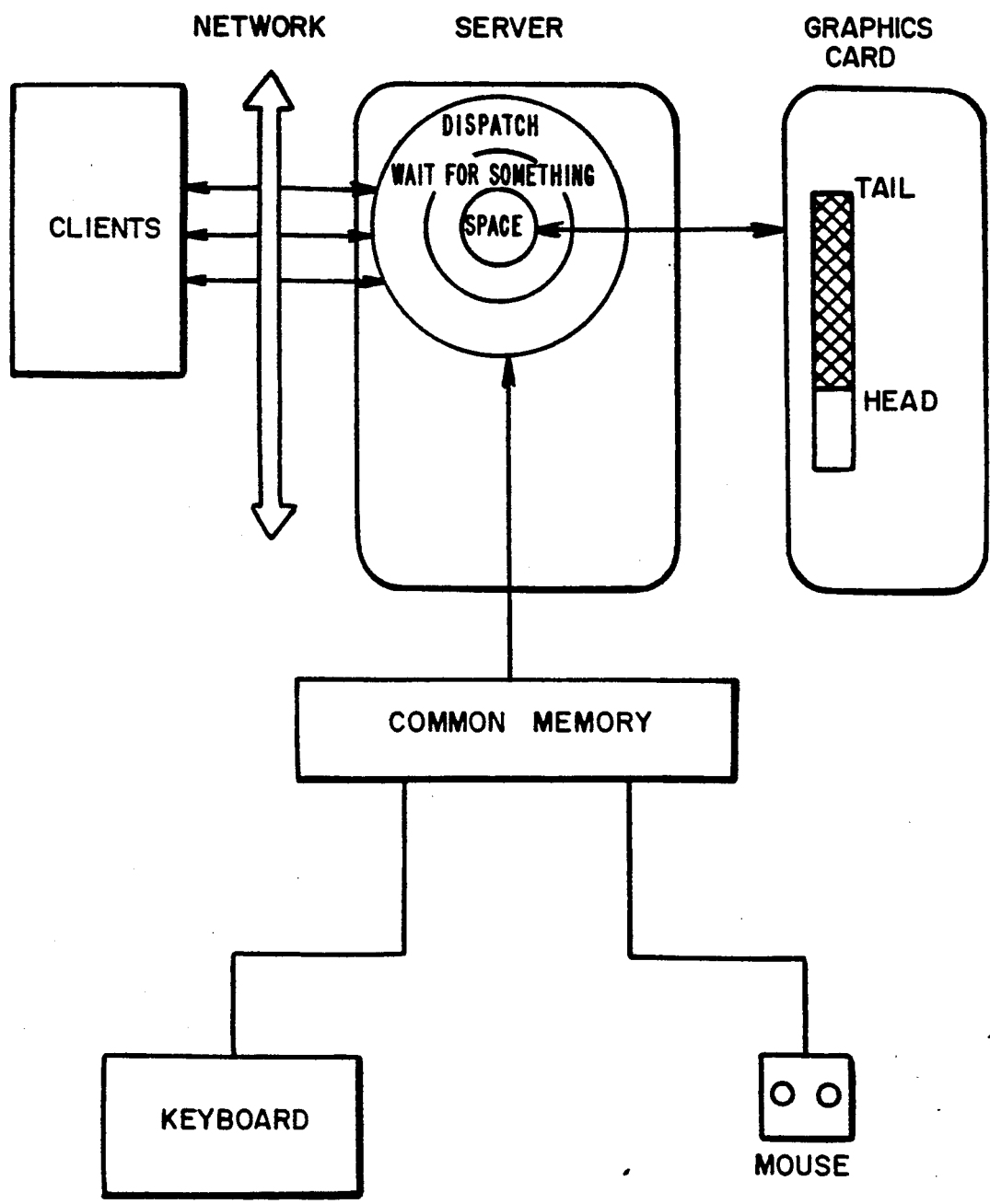
FIG. 14 is an illustration of a multitasking work station connected to a network.

FIG. 7 illustrates the location of the various routines with respect to the DIX, DDX and OS layers (also see FIG. 14, showing the location and relation of Dispatch, Wait-For-Something and Qspace). As shown in FIG. 7, the display software comprises the display host software and display remote software. The client, X-Protocol, OS, DDX, X-Window, Qspace and host display software are all processed in the host processor. The remote display software is processed on the graphics processor. The display host software and the display remote software communicate with each other via the bus interface 10 (FIG. 1). The dispatch routine is processed in the DIX layer, and the Wait-For-Something routine, in the OS layer.

Figure 16:
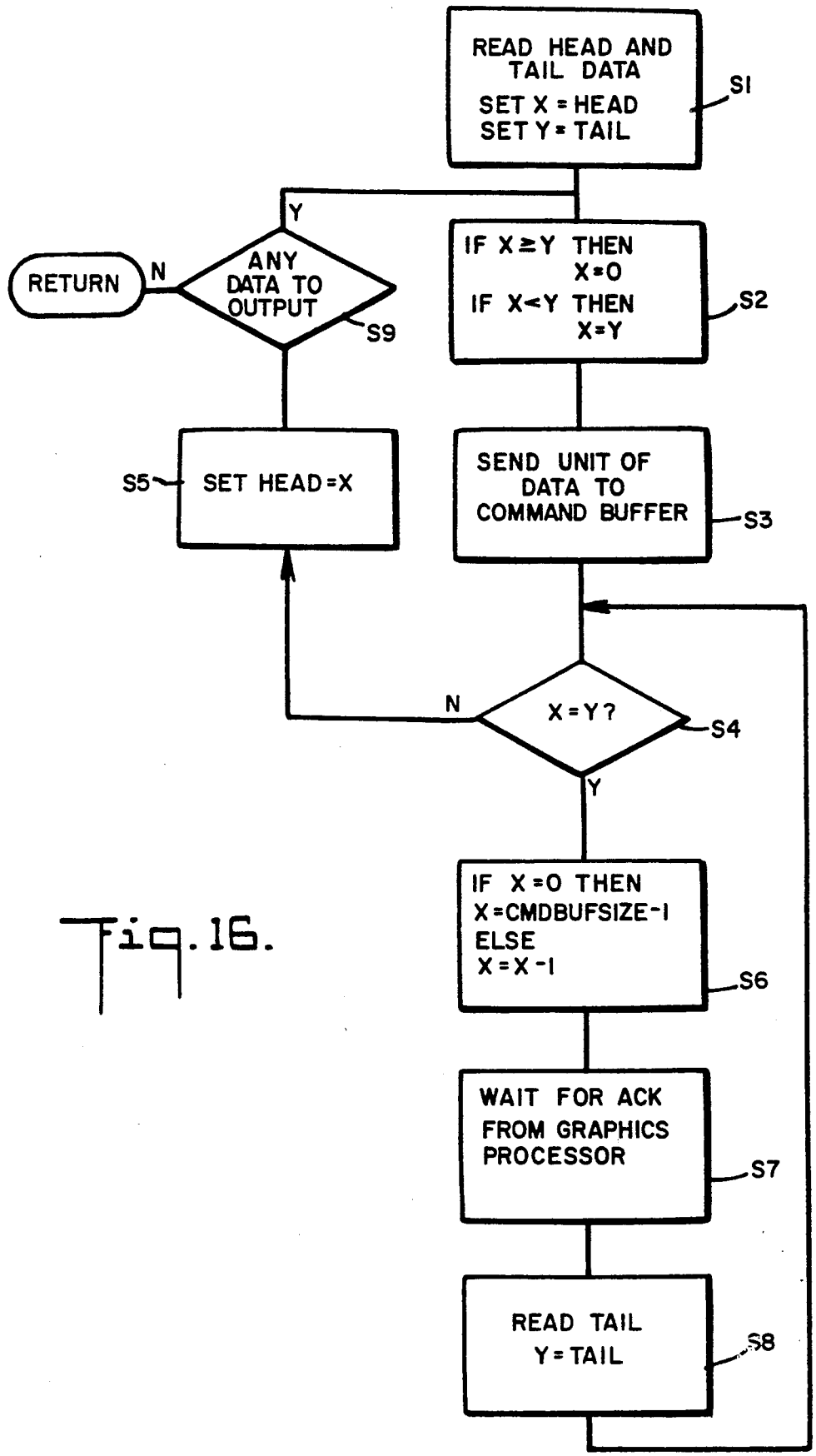
FIG. 16 is a flow chart of the display host software used in the first embodiment.
Figure 17:
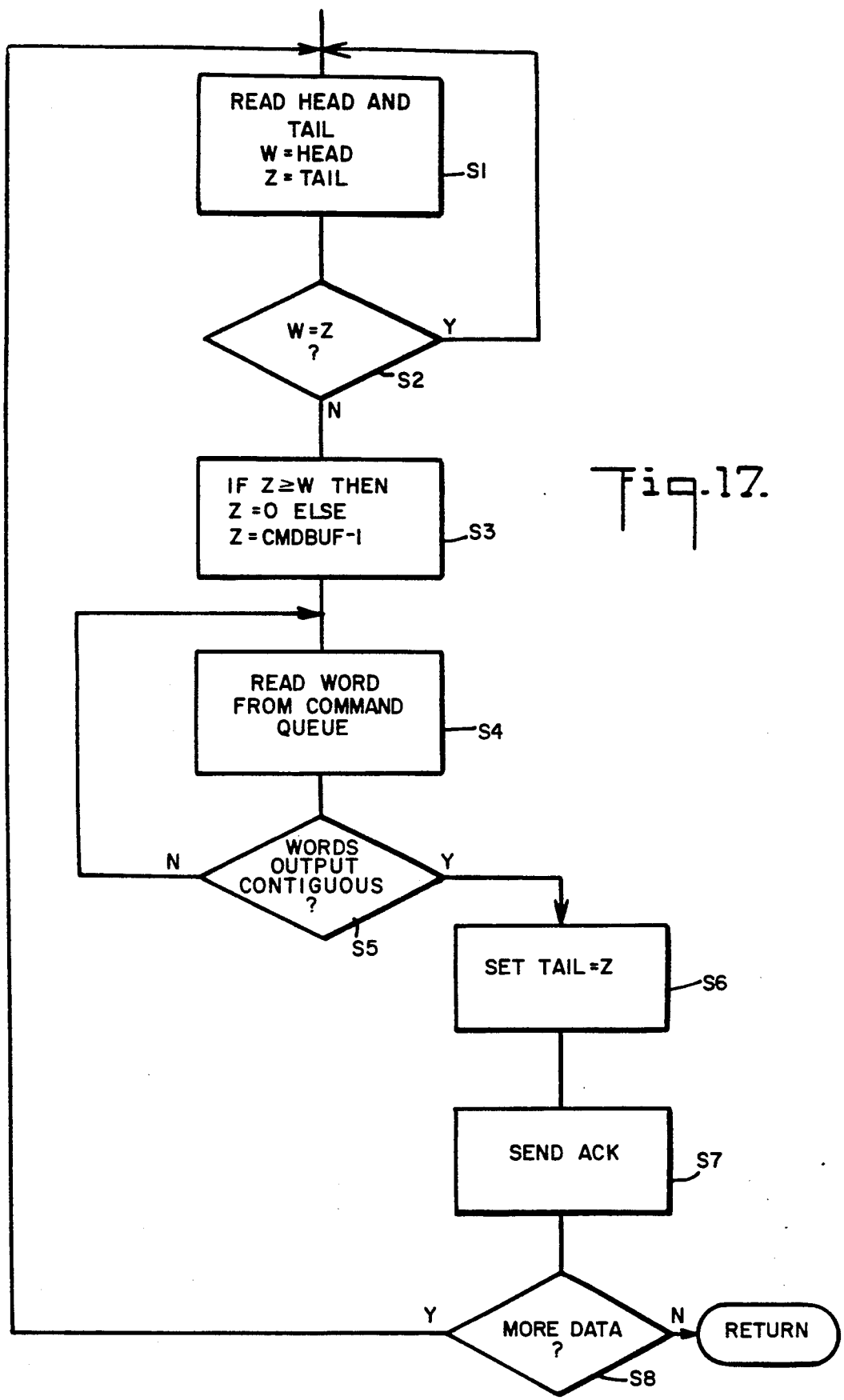
FIG. 17 is a flowchart of the display remote software in the first embodiment.

An example of the display software, provided by Graphic Software Systems, Inc., is illustrated in FIGS. 16 and 17.

FIG. 16 is a flow chart illustrating the logic of the host display software. If there is data to be outputted, the Head and Tail addresses of the command queue buffer are stored in local variables X and Y, respectively, in step S1. The local variable X is set to zero if X is greater than or equal to Y, and otherwise X is set to Y, in step S2. A unit of data is then sent to the graphics processor, step S3. If X does not equal Y, the Head value in the graphics processor is set to current value of X, and if there is still data to be outputted, steps S3 and S4 are repeated. If X=Y, then X is set to the command buffer size minus one otherwise X is decremented by one. Processing is suspended until the receipt of an acknowledgment from the remote display software (step S7, FIG. 17). Upon receipt, Y is set to the new Tail value, and processing proceeds to step S4, as discussed above.

FIG. 17 illustrates the remote display software. In step S1 the Head and Tail addresses are read from the command queue buffer and stored in variables W and Z, respectively. If W equals Z (step S2), step S1 is repeated, while otherwise processing proceeds to step S3. In step S3, Z is set to zero if Z is greater than or equal to W, while Z is set to CMDBUFSIZE-Z if Z is less than W. In step S4 a word is read from the command queue buffer. If the word is output contiguously processing proceeds to step S6, and otherwise step S4 is repeated. The Tail address in the command queue is set to Z, and an acknowledgment is sent to the host display software. The processing returns to step S1 if there is more data to be read.

Figure 9B:
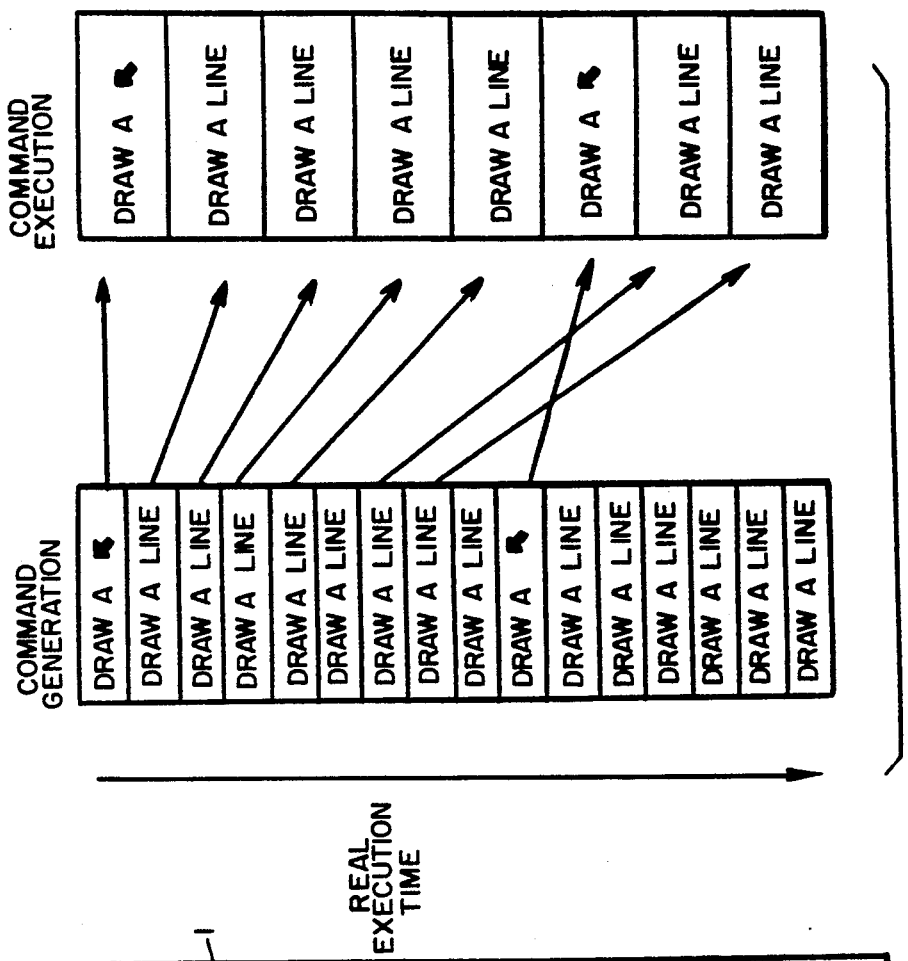
FIG. 9, consisting of FIGS. 9A and 9B, is an illustration of a drawing request and partial re-writing using the invention.
Figure 9A:
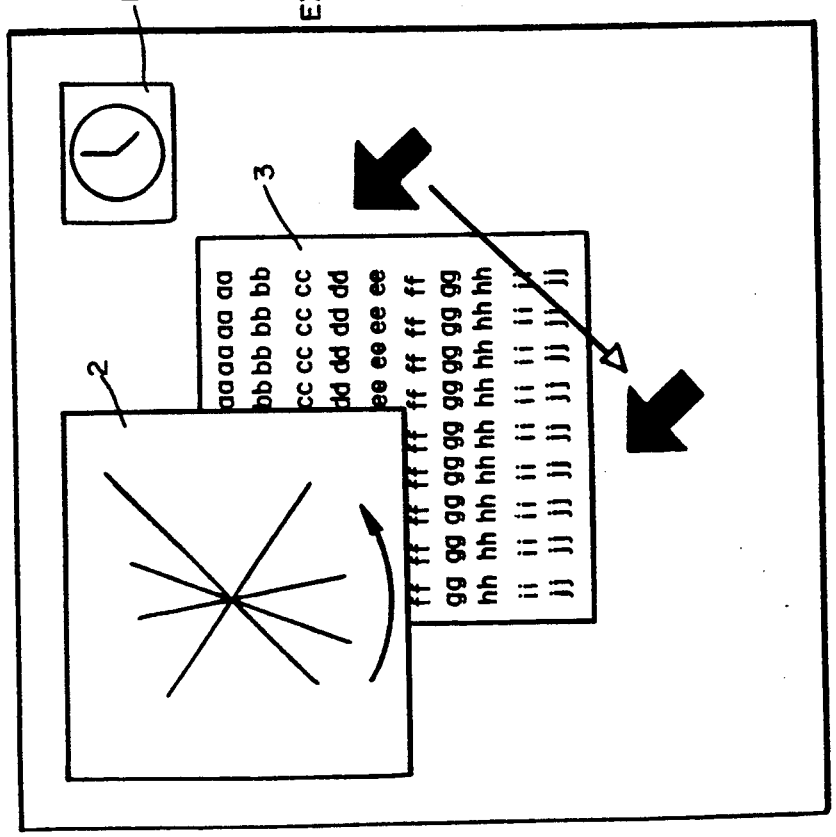

FIGS. 9A and 9B illustrate a display according to an embodiment of the invention. FIG. 9A illustrates three windows on a display, similar to those in FIG. 8A. The left side of FIG. 9B shows a sequence of graphics commands generated by the host, and the right side shows the commands being executed. Notice that the command to draw a font representing the mouse is executed out of sequence, prior to any not-yet-executed graphics commands received from any of the clients. Thus the mouse display request is executed at substantially the time the display request is generated.

Figure 3B:
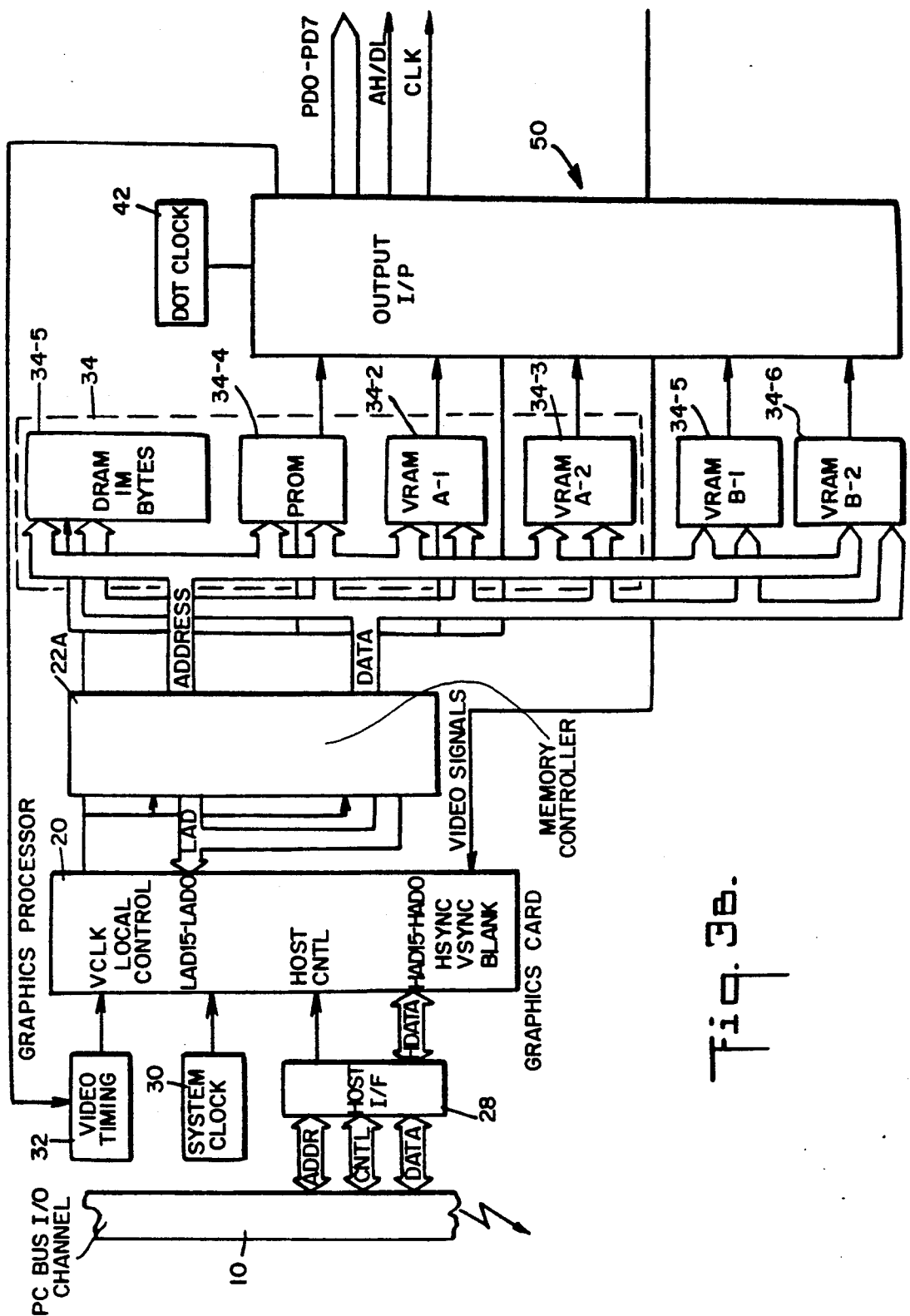
FIG. 3B is a block diagram of another graphics card, according to a second embodiment.

FIG. 3B shows a modification of the graphics controller 6 of FIG. 3A, having a processor with multi-instruction capability, such as a Motorola 68020, 68030, or 68040 or an Intel 80286 or 80386. In this example, the interface may be the VME bus for Digital Equipment Corporation (DEC) computers, the Multi-bus for Hewlett-Packard computers, the Nu Bus for Apple or NeXt computers or the Micro Channel Adaptor for IBM computers. The arrangement of FIG. 3B is similar to that of FIG. 3A except that the graphics controller in this embodiment has multiple sets of video memory (set A, consisting of VRAM's A-1 34-2 and A-2 34-3 and set B consisting of VRAM's B-1 34-5 and B-2 35-6) for processing. Each set of video memory services a portion of the plural tasks being processed on the host processor.

Figure 3C:
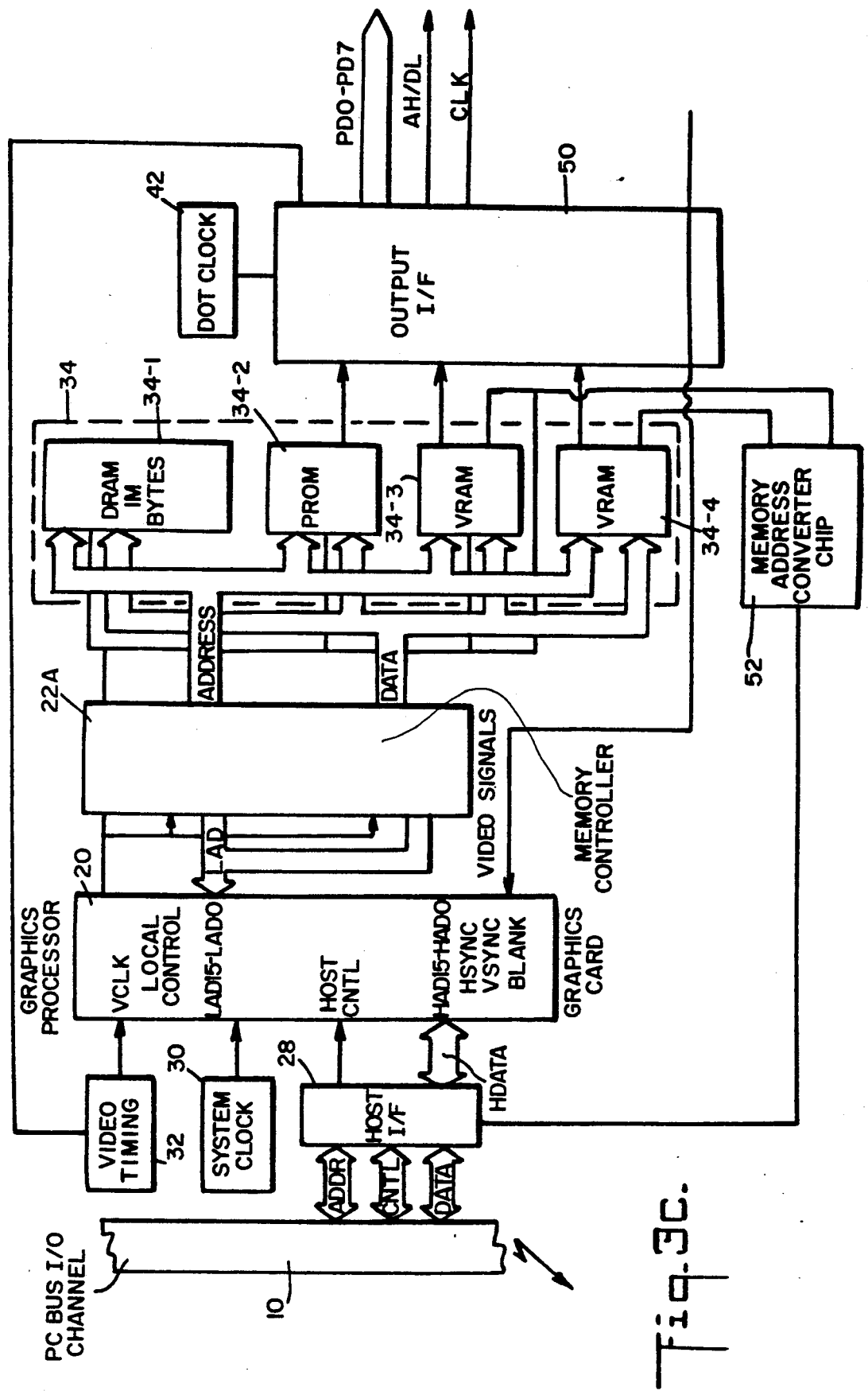
FIG. 3C is a block diagram of a graphics card according to a third embodiment.

FIG. 3C is another embodiment of the graphics controller. In this embodiment, the graphics controller also comprises a memory address conversion chip. The arrangement of FIG. 3C is also similar to that of FIG. 3A except that in the embodiment of FIG. 3C, font type data is transferred to the memory address conversion chip 52. The other graphics data is processed by the graphics processor 20, as in the embodiment of FIG. 3A. The memory address conversion chip 52 converts the font data into graphics data which is then transferred to the video memory. The RAM 34-1, instead of storing the graphics instruction for the font data, stores the fact that the memory address conversion chip 52 processes the font data.

It will be appreciated by those skilled in the art that the invention is not limited to the ferroelectric liquid crystal display, but is applicable to a CRT or any other display.

While the invention has been described illustratively with reference to the details of the preferred embodiments, many modifications and variations of will now be apparent to those skilled in the art, and the scope of the invention is therefore not to be limited by the details described above, but is to be determined by the scope of the appended claims.

What is claimed is:

1. A data processing apparatus comprising:
   a host processor including multitasking means for executing a plurality of processes in a time sharing manner,
   scheduling means for scheduling drawing requests generated in parallel from the plurality of processes and forming the drawing requests into a single sequence of drawing commands, said multitasking means and said scheduling means being connected to interact logically, and
   a graphics device for controlling a display device to draw a picture in accordance with a predetermined unit of drawing commands transferred from the single sequence in said scheduling means,
   wherein said scheduling means monitors an execution status of the predetermined unit of drawing commands at the graphics device, and reserves the scheduling of the drawing request from each of the processes until the execution status advances to a predetermined stage, and wherein said drawing requests from the plurality of processes include a drawing request related to a hardware event and said scheduling means schedules the hardware event-related drawing request with priority over other requests.

2. A data processing apparatus according to claim 1, wherein the hardware event is generated in response to an operation of a device selected from the group consisting of a keyboard, a mouse, a light pen, a touch screen and a track ball.

3. A data processing apparatus according to claim 1, wherein said scheduling means provides a multi-window function on a single screen of said graphics device.

4. A data processing apparatus according to claim 1, wherein said display device comprises a ferroelectric liquid crystal display panel.

5. A data processing apparatus comprising graphics device means for drawing a picture on a screen in accordance with a drawing command, and host processor means for running a process of generating the drawing command and for transferring the generated drawing command to said graphics device means,
   wherein said host processor means monitors a drawing request and a hardware event from the running process to said graphics device means, sequentially registers the drawing command generated in response to the monitored drawing request in a first queue and executes the monitored hardware event,
   wherein said host processor means further monitors an execution status of the drawing command transferred to said graphic device means, and controls, in accordance with the execution status, registration of the generated drawing command in said first queue, and
   wherein said host processor means suspends monitoring of the drawing request to said graphics device means until the execution of the drawing command transferred to said graphics device means reaches a predetermined stage and executes the monitored hardware event with priority over the monitored drawing request.

6. A data processing apparatus according to claim 5, further comprising a buffer for storing the drawing command transferred to said graphics device means, wherein the drawing request to said graphics device means starts to be monitored when an amount of unexecuted commands in said buffer becomes at most a predetermined amount.

7. A data processing apparatus according to claim 5, further comprising a buffer for storing the drawing command transferred to said graphics device means, wherein the drawing request starts to be monitored in response to a first to occur of an unexecuted command being not present in said buffer and said host processor means judging that there is free space for storing the next drawing command.

8. A data processing apparatus according to any one of claims 5, 6 and 7 wherein said host processor provides a plurality of processes run in a time sharing manner, registers the generated drawing command in a second queue provided for each drawing generation process by said host processor means, controls the registered drawing commands in said second queue as a single sequence, and stores the registered drawing commands in said first queue.

9. A data processing apparatus according to claim 5, wherein the hardware event is generated in response to an operation of a device selected from the group consisting of a keyboard, a mouse, a light pen, a touch screen and a track ball.

10. A data processing apparatus according to claim 5, wherein said graphics device means comprises a ferroelectric liquid crystal display panel device.

11. A data processing apparatus comprising:
- a graphics device including a display panel and a local processor for driving said panel in accordance with a drawing command to draw a picture on said display panel;
- a user operation device for generating a hardware event; and
- a host computer processor including client execution means for running a drawing process and server means for conducting a scheduling of monitoring a drawing request from the drawing process and the hardware event, said server means transferring the drawing command to said local processor in response to the drawing request and informing the drawing process of the hardware event in response to the hardware event, said client execution means and said server means being connected to interact logically, wherein said server means executes the hardware event with priority over the drawing request if said hardware event and said drawing request occur substantially at the same time, and monitors an execution status of the drawing commend by said local processor to reserve scheduling of the drawing request until the execution status reaches a predetermined stage.

12. A data processing apparatus according to claim 11, wherein said display panel comprises a ferroelectric liquid crystal panel.

13. A data processing apparatus according to claim 11, wherein said server provides the drawing command to the local processor.

* * * * *

UNITED STATES PATENT AND TRADEMARK OFFICE
CERTIFICATE OF CORRECTION

PATENT NO. : 5,253,340
DATED : October 12, 1993
INVENTOR(S) : HIROSHI INOUE

It is certified that error appears in the above-identified patent and that said Letters Patent is hereby corrected as shown below:

ON TITLE PAGE

In [73] Assignee: "Shimomaruko" should read --Tokyo--.

IN THE DRAWINGS

Sheet 2 of 18, Fig. 3A: "DATE" should read --DATA--.

COLUMN 1

Line 68, "larger<the" should read --larger the--.

COLUMN 3

Line 42, "line" should read --lines--.

COLUMN 5

Line 33, "that," should read --that--.

COLUMN 12

Line 32, "graphic" should read --graphics--.

UNITED STATES PATENT AND TRADEMARK OFFICE
CERTIFICATE OF CORRECTION

PATENT NO. : 5,253,340
DATED : October 12, 1993
INVENTOR(S) : HIROSHI INOUE

It is certified that error appears in the above-identified patent and that said Letters Patent is hereby corrected as shown below:

<u>COLUMN 14</u>

Line 9, "commend" should read --command--.

Signed and Sealed this

Sixth Day of September, 1994

Attest:

BRUCE LEHMAN

Attesting Officer     Commissioner of Patents and Trademarks